Aug. 2, 1927.
G. W. STONE
1,637,665
TRACTOR COUPLING DEVICE
Filed Dec. 28, 1925  3 Sheets-Sheet 3
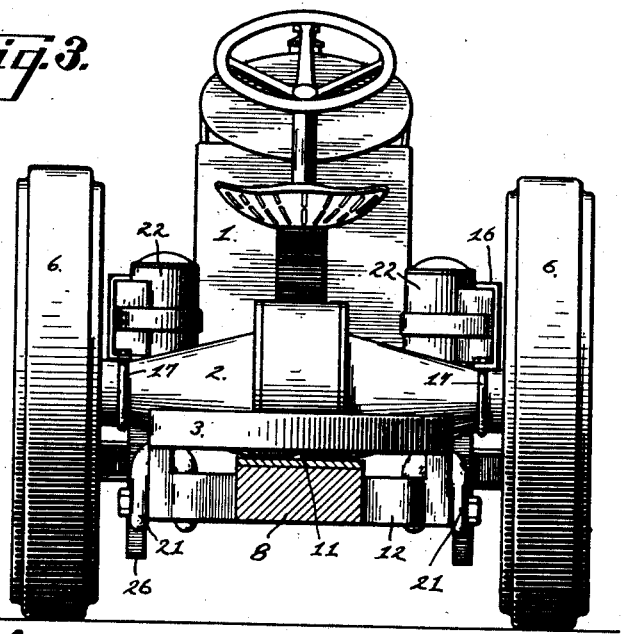
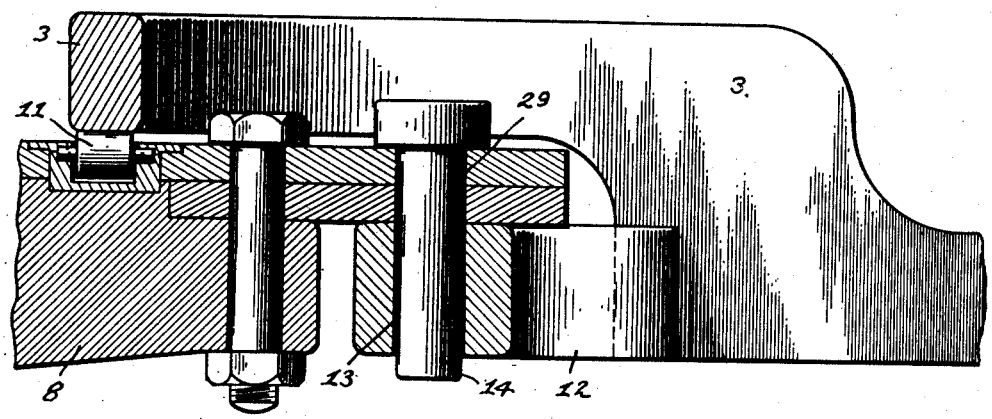
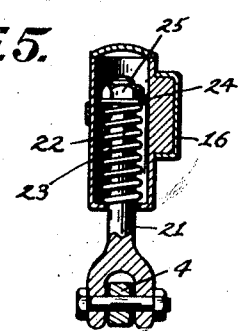
INVENTOR
GEORGE W. STONE
BY Arthur L. Slee
ATTY.

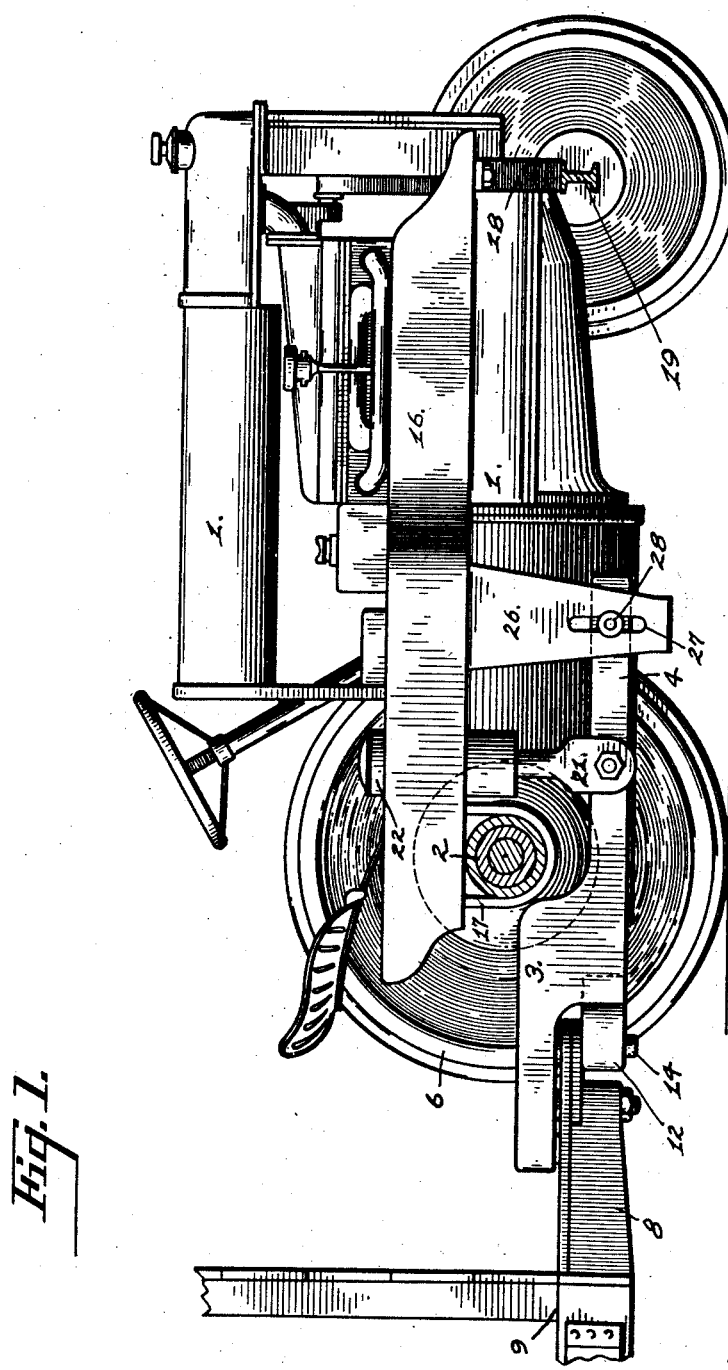

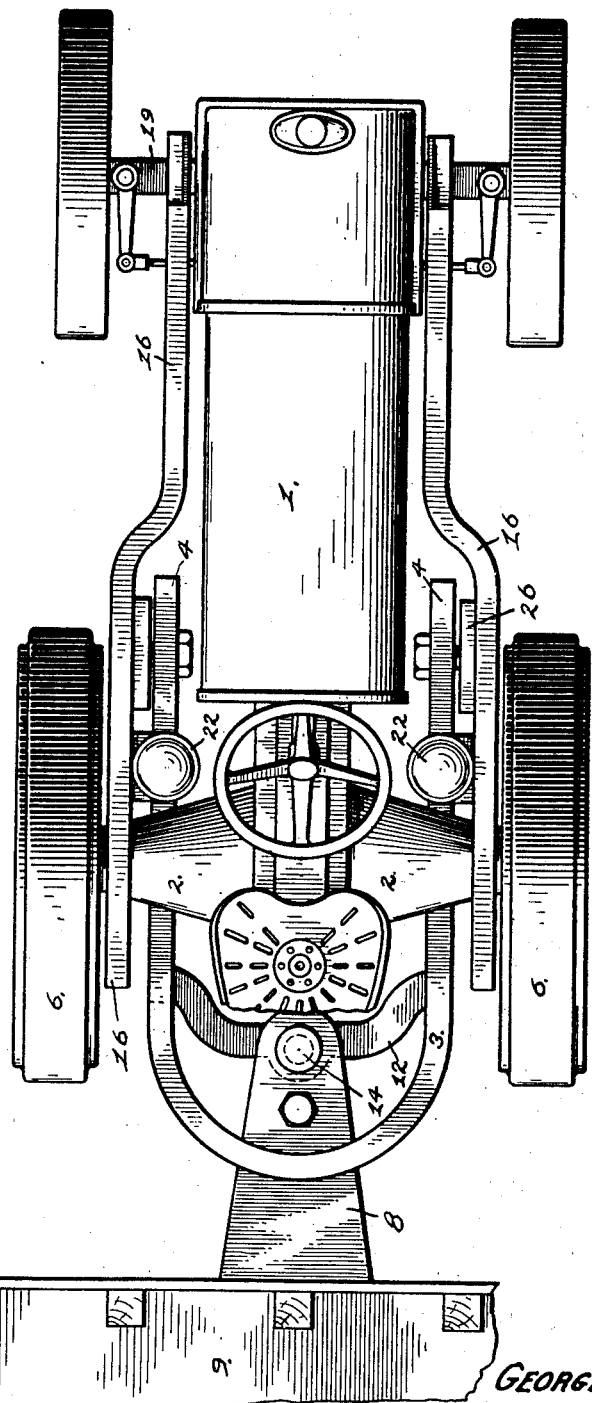

Patented Aug. 2, 1927.

1,637,665

UNITED STATES PATENT OFFICE.

GEORGE W. STONE, OF SAN FRANCISCO, CALIFORNIA, ASSIGNOR TO NATIONAL AUTO BODY WORKS, OF SAN FRANCISCO, CALIFORNIA.

TRACTOR-COUPLING DEVICE.

Application filed December 28, 1925. Serial No. 77,927.

My invention relates to improvements in coupling devices for coupling trailer truck bodies, and the like to tractors of the Fordson type whereby the weight will be resiliently supported at a point forward of the rear axle of the tractor.

The primary object of my invention is to provide an improved coupling device for tractors.

Another object is to provide an improved coupling device which will direct the weight supported by the tractor in front of the rearward axle to increase the stability and traction of the tractor.

A further object is to provide an improved coupling device which may be economically applied and which may be installed without altering or effecting any portion of the tractor.

Another object is to provide an improved device of the character described which will resiliently support the weight imposed upon the tractor and which will permit the tractor and a trailer or other vehicle drawn thereby to be turned upon a very short turning radius.

A still further object is to provide an improved coupling of an extremely strong and rugged construction and which can be easily and quickly connected to a vehicle to be drawn by the tractor.

I accomplish these and other objects by means of the device disclosed in the drawings forming a part of the present specification wherein like characters of reference are used to designate similar parts throughout said specification and drawings and in which, Fig. 1 is a side elevation of a tractor with the near wheels removed and showing my improved coupling device applied thereto.

Fig. 2 is a plan view of the device as illustrated in Fig. 1.

Fig. 3 is a rear elevation of the tractor and coupling.

Fig. 4 is a sectional detail drawn upon a somewhat larger scale and showing the manner in which the yoke is connected to the tongue of a trailer.

Fig. 5 is a vertical section of a cylinder and connecting member, showing the manner in which the yoke is resiliently supported.

Referring to the drawings the numeral 1 is used to designate in general a tractor of the Fordson type such as commonly used for drawing trailer or truck bodies for heavy hauling. It has been found that by connecting a trailer or truck body to such a tractor at a point in front of the rear axle 2 of the tractor the stability will be greatly increased and an increased traction obtained.

To obtain such a connection I have provided an improved coupling device consisting of a yoke 3 having arms 4 arranged to extend forwardly between the rear wheels 6 of a tractor 1, and below the rear axles 2 thereof. The yoke 3 is made substantially U shaped with a substantially semicircular portion arranged to extend across the upper side of a tongue 8 secured in connection with a trailer or truck body 9 of any desired form or construction, said semicircular portion resting upon a suitable roller 11 mounted within the tongue. The semicircular portion is offset relative to the arms and a bar 12 is connected across the yoke at substantially the point of offset to extend under the tongue 8 as best illustrated in Figs. 1 and 4 of the drawings. The bar 12 is provided with an aperture 13 to receive a pintle 14 whereby the tongue 8 may be pivotally connected to the yoke. The bar 12 is offset rearwardly from the points at which its ends are connected to the arms 4 of the yoke in order to permit the yoke to be moved through a wide degree of movement relative to the tongue 8 as hereinafter more fully explained.

A pair of supporting members 16 formed from channel iron or other suitable material are longitudinally disposed along the sides of the tractor 1, said members being secured above the rear axles 2 by means of suitable securing elements such as U bolts 17. The forward ends of the members 16 are secured to the front axle 19 of the tractor. The yoke 3 is connected to the supporting members 16 and supported thereby below the rear axles of the tractor by means of connecting members 21. The lower ends of the members 21 are bifurcated and are pivotally bolted to the arms 4. The upper ends of the members 21 extend upwardly into a pair of cylinders 22 secured upon the inner sides of the members 16 just in front of the rear axles. Springs 23 are mounted within the cylinders. The members 21 extend upwardly through the springs 23 and are provided with suitable washers 24 and nuts 25 upon the extreme upper ends, said nuts and washers resting upon the springs and supporting the weight of the yoke.

Guide plates 26 are secured upon the supporting members, said plates extending downwardly past the arms 4 of the yoke. Slots 27 are formed in the plates opposite the arms 4 to receive pins 28 secured to the arms 4, said plates thereby operating to brace the arms transversely and to guide the vertical movement thereof.

In operation, the yoke 3 and its supporting members is applied upon the tractor in the manner illustrated and above described. When the device is to be coupled to a trailer or truck body, the tractor and body are moved to bring the aperture 13 into registering relation with an opening 29 formed in the end of the tongue 8 and the pintle 14 inserted to pivotally secure the tongue to the yoke bar 12. When thus connected the semicircular portion of the yoke will extend across the tongue and normally rest upon the roller 11. The bar 12 will be positioned immediately below the forward end of the tongue, or in the preferred construction illustrated, immediately below an extension formed from plates extending forwardly from the main body of the tongue 8.

The weight of the trailer or truck body 9 rests upon the bar 12 and is carried by the connecting members 21 resiliently secured just in advance of the rear axles 2 as above explained. By mounting the cylinders 22 and connecting members 21 just in front of the rear axles 2, the weight will operate to hold the tractor down, thereby obtaining stability and increasing the traction which can be obtained. The resilience afforded by the springs 23 permits a vertical movement sufficient to allow for any irregularities in the surface of the roadway being traversed and at the same time absorbs vibration and prevents sudden shock loads from being imposed upon the tractor and the coupling elements. The weight is carried by the longitudinally disposed supporting members 16 in such a manner that the greater portion of the load is carried by the rear wheels and axles while only a very small portion of the load is directed upon the front wheels and axles which are made of relatively light construction.

The structure of the yoke is such that the tongue 8 of the trailer or truck body is efficiently held in engagement therewith. By offseting the bar 12 as above explained, the tractor may be turned to a position substantially at right angles to the body 9 thereby permitting the tractor and trailer to be turned upon a very short turning radius. The roller 11 permits free movement of the yoke over the tongue 8.

It will be noted that the several members are applied upon the tractor body without removing or altering any portion of the tractor, thereby facilitating the mounting of the yoke upon the truck and avoiding the cost involved in altering or replacing parts of the tractor itself. The independent nature of the several elements of the device and the manner in which they are assembled upon the tractor also permits the device to be designed to meet the requirement of any particular size or type of truck or trailer body without altering the mode of applying the device upon the tractor.

While I have illustrated and described what I consider to be the preferred form and construction, the device may be modified and construction in numerous ways without departing from the spirit of my invention. I therefore do not wish to restrict myself to the specific construction shown, but desire to avail myself of all modifications which may fall within the scope of the appended claims.

Having thus described my invention what I claim as new and desire to secure by Letters Patent is,

1. A tractor and trailer coupling comprising a pair of coupling supporting members mounted along the sides of a tractor independently of the tractor frame and in connection with the rear and front axles thereof; a yoke, arranged to be connected to a trailer; and means connected between the yoke and the supporting members for supporting said yoke and imparting tractive force.

2. A tractor and trailer coupling comprising a pair of longitudinally disposed coupling supporting members mounted along the sides of a tractor independently of the tractor frame and in connection with the rear and front axles thereof; a yoke arranged to be pivotally connected to a trailer to be drawn by the tractor; and means connected between the yoke and the supporting members in advance of the rear axle for supporting said yoke and imparting tractive force.

3. A tractor and trailer coupling comprising a pair of longitudinally disposed coupling supporting members mounted along the sides of a tractor independently of the tractor frame and above the rear and front axles thereof; a yoke arranged to be pivotally connected to a trailer to be drawn by the tractor; and means connected between the yoke and the supporting members in advance of the rear axle for supporting said yoke below said axle and for imparting tractive force.

4. A tractor and trailer coupling comprising a pair of longitudinally disposed supporting members mounted along the sides of a tractor above the rear and front axle thereof; a yoke arranged to be pivotally connected to a trailer to be drawn by the tractor; and means resiliently connected between the yoke and the supporting members in advance of the rear axle for supporting said yoke below said axle and for imparting tractive force.

5. A tractor and trailer coupling comprising a pair of longitudinally disposed supporting members mounted along the sides of a tractor above the rear and front axles thereof; a yoke arranged to be pivotally connected to a trailer to be drawn by the tractor; a pair of connecting members slidably connected to the supporting members and connected to the forward ends of the yoke in advance of the rear axle for supporting said yoke below said axle and for imparting tractive force.

6. A tractor and trailer coupling comprising a pair of longitudinally disposed supporting members mounted along the sides of a tractor above the rear and front axles thereof; a yoke arranged to be pivotally connected to a trailer to be drawn by the tractor; a pair of connecting members slidably connected to the supporting members and connected to the forward ends of the yoke in advance of the rear axle for supporting said yoke below said axle and for imparting tractive force; and springs mounted in connection with said connecting members for resiliently supporting the same in engagement with the supporting members.

7. A tractor and trailer coupling comprising a pair of longitudinally disposed supporting members mounted along the sides of a tractor above the rear and front axles thereof; a yoke arranged to be pivotally connected to a trailer to be drawn by the tractor; a pair of cylinders secured upon the supporting members in advance of the rear axle; springs mounted within the cylinders; connecting members pivotally connected to the yoke and leaving their upper ends slidably engaged within the cylinders above the springs and supported thereby, said members operating to resiliently support the yoke and to impart tractive force.

8. A tractor and trailer coupling comprising a pair of longitudinally disposed supporting members mounted along the sides of a tractor above the rear and front axles thereof; a yoke arranged to be pivotally connected to a trailer to be drawn by the tractor; a pair of cylinders secured upon the supporting members in advance of the rear axle; springs mounted within the cylinders; connecting members pivotally connected to the yoke and having their upper ends slidably engaged within the cylinders above the springs and supported thereby, said members operating to resiliently support the yoke and to impart tractive force; and means for guiding and bracing the forward ends of the yoke.

9. In a trailer and tractor coupling, a yoke arranged to be supported upon a tractor and to extend across the upper side of a tongue connected to a trailer to be drawn by the tractor; and a bar connected across the yoke and arranged to extend under the tongue, said bar being apertured to receive a pintle whereby the yoke may be pivotally connected to the tongue.

10. In a trailer and tractor coupling, a yoke arranged to be supported upon a tractor, said yoke having arms extending along the sides of a tractor and a rearwardly disposed U shaped portion upwardly offset from the arms and arranged to extend across the top of a tongue connected to a trailer to be drawn by the tractor; and a bar connected across the yoke and arranged to extend under the tongue, said bar being apertured to receive a pintle whereby the yoke may be pivotally connected to the tongue.

11. In a trailer and tractor coupling, a yoke arranged to be supported upon a tractor, said yoke having arms extending along the sides of a tractor and having a rearwardly disposed U shaped portion upwardly offset from the arms and arranged to extend across the top of a tongue connected to a trailer to be drawn by the tractor; and a bar connected across the yoke and having an aperture arranged to receive a pintle whereby the yoke may be pivotally connected to the tongue, said bar extending under the tongue to cooperate with the yoke to prevent vertical movement of the tongue relative thereto, and being rearwardly offset to afford a short turning radius.

12. In a trailer and tractor coupling, a yoke arranged to be supported upon a tractor, said yoke having arms extending along the sides of a tractor and having a rearwardly disposed U shaped portion upwardly offset from the arms and arranged to extend across the top of a tongue connected to a trailer to be drawn by the tractor; and a bar connected across the yoke and having an aperture arranged to receive a pintle whereby the yoke may be pivotally connected to the tongue, said bar extending under the tongue to cooperate with the yoke to prevent vertical movement of the tongue relative thereto, and being rearwardly offset to afford a short turning radius; and means for resiliently supporting the yoke below the rear axle of the truck.

13. In a trailer and tractor coupling, a yoke arranged to be supported upon a tractor, said yoke having arms extending along the sides of a tractor and having a rearwardly disposed U shaped portion upwardly offset from the arms and arranged to extend across the top of a tongue connected to a trailer to be drawn by the tractor; a roller mounted within the tongue to be engaged by the U shaped portion of the yoke; and a bar connected across the yoke and having an aperture arranged to receive a pintle whereby the yoke may be pivotally connected to the tongue, said bar extending under the tongue and being offset to permit a wide degree of movement between the yoke and the tongue.

14. In a trailer and tractor coupling, the combination with supporting members mounted along the sides of a tractor and a yoke arranged to be connected to the tongue of a trailer, of a cylinder mounted upon each supporting member; a spring mounted within each cylinder; and a connecting member pivotally connected to each arm of the yoke and extending upwardly into sliding engagement with the cylinder, said connecting members being resiliently supported upon the spring; and braces secured upon the supporting members and slidably engaging the arms of the yoke to brace the yoke and guide the same when moved vertically relative to the tractor.

In witness whereof I hereunto set my signature.

GEORGE W. STONE.